US012758462B2

(12) United States Patent
Yuan

(10) Patent No.: US 12,758,462 B2
(45) Date of Patent: Oct. 13, 2026

(54) NEGATIVE-PRESSURE MASSAGE CUP

(71) Applicant: BIBOTING INTERNATIONAL CO., LTD., Taoyuan City (TW)

(72) Inventor: Li-Pin Yuan, Taoyuan City (TW)

(73) Assignee: BIBOTING INTERNATIONAL CO., LTD., Taoyuan City (TW)

(*) Notice: Subject to any disclaimer, the term of this patent is extended or adjusted under 35 U.S.C. 154(b) by 600 days.

(21) Appl. No.: 18/232,812

(22) Filed: Aug. 10, 2023

(65) Prior Publication Data

US 2025/0049627 A1 Feb. 13, 2025

(51) Int. Cl.
*A61H 9/00* (2006.01)
*A61H 23/00* (2006.01)

(52) U.S. Cl.
CPC ........... *A61H 9/0057* (2013.01); *A61H 23/00* (2013.01); *A61H 2023/002* (2013.01); *A61H 2201/0107* (2013.01); *A61H 2201/0165* (2013.01)

(58) Field of Classification Search
CPC .................. A61H 23/00; A61H 9/0057; A61H 2201/0107; A61H 2201/0165
See application file for complete search history.

(56) References Cited

U.S. PATENT DOCUMENTS

| | | | | |
|---|---|---|---|---|
| 11,857,490 B2 * | 1/2024 | Liu | ........................ | A61H 23/02 |
| 2020/0390948 A1 * | 12/2020 | Liu | ...................... | A61H 9/0057 |
| 2022/0339061 A1 * | 10/2022 | Chen | .................... | A61H 23/006 |

* cited by examiner

*Primary Examiner* — Timothy A Stanis
*Assistant Examiner* — Danielle B Restaino
(74) *Attorney, Agent, or Firm* — HDLS IPR SERVICES; Chun-Ming Shih

(57) ABSTRACT

A negative-pressure massage cup includes a cup body having a first installing portion on an outer surface thereof, a vibration mechanism having an outer case, a vibrator disposed in the outer case and a second installing portion and a third installing portion respectively disposed on two opposite sides of the outer case, and a buffer rubber disposed on the second installing portion. The third installing portion is removably disposed on the first installing portion. While the negative-pressure massage cup is free falling, the cup body is rotated by a gravity loaded on the vibration mechanism so as to make the buffer rubber downward to absorb and reduce an impact caused by a collision to the negative-pressure massage cup. The vibration mechanism is prevented from damaging to the vibrator caused by a collision or noise caused by dislocating of the components in the vibrator so as to effectively improve durability.

10 Claims, 4 Drawing Sheets

NEGATIVE-PRESSURE MASSAGE CUP

BACKGROUND

Technical Field

The disclosure relates to a negative-pressure massage cup, particularly to a negative-pressure massage cup with a buffer rubber which can prevent damage caused by a collision.

Related Art

Modern people are suffered from various pressures caused by a fast-paced life, e abnormal diet, lacking of exercise, and long-term poor posture, etc., these often lead to problems such as body aches or poor blood circulation. Therefore, various massage-related products have been developed on the market. By these products, users can achieve the effects of relaxing and improving body functions. Among them, the negative-pressure massage cup can achieve effects similar to cupping, so as to promote the blood circulation of the skin to relax the muscles by various degrees of suction, and the effect of enhancing blood circulation and massaging can be further achieved by a vibrator on the negative-pressure massage cup.

However, general negative-pressure massage cups are made of plastic or acrylic, and the vibrator is usually installed on the outside of the negative-pressure massage cup. Therefore, when the negative-pressure massage cup is accidentally dropped, the negative-pressure massage cup will be rotated by the gravity because the weight of the vibrator is heavier than the cup body of the negative-pressure massage cup, so that the vibrator will be turned downward to directly hit into the ground or other objects, and this further leads to damage to the vibrator or noise caused by shifting of internal parts.

In view of this, the inventors have devoted themselves to the above-mentioned prior art, researched intensively and cooperated with the application of science to try to solve the above-mentioned problems. Finally, the invention which is reasonable and effective to overcome the above drawbacks is provided.

SUMMARY

An object of the disclosure is to prevent the vibration mechanism from damaging to the vibrator caused by a collision or noise caused by dislocating of the components in the vibrator so as to effectively improve durability.

To accomplish the above object, the disclosure provides a negative-pressure massage cup, which includes a cup body, a vibration mechanism, and a buffer rubber. The cup body has a first installing portion on an outer surface thereof. The vibration mechanism includes an outer case and a vibrator. The vibrator is disposed in the outer case. The vibration mechanism has a second installing portion and a third installing portion respectively disposed on two opposite sides of the outer case. The third installing portion is removably disposed on the first installing portion. The buffer rubber is disposed on the second installing portion. While the negative-pressure massage cup is free falling, the cup body is rotated by a gravity loaded on the vibration mechanism so as to make the buffer rubber downward to absorb and reduce an impact caused by a collision to the negative-pressure massage cup.

In an embodiment of the disclosure, the second installing portion is a recess and comprises a connecting surface, and an inner surface of the buffer rubber is attached on the connecting surface.

In an embodiment of the disclosure, the connecting surface comprises multiple holes, and an inner wall of the buffer rubber comprises multiple bars, and the bars are combined and sealed with the holes respectively.

In an embodiment of the disclosure, the connecting surface is a curved surface.

In an embodiment of the disclosure, the buffer rubber is extended with multiple arms, the second installing portion has four corners, each corner is provided with a trough, the troughs are extended corresponding to arms respectively, and the arms are disposed on the troughs respectively to cover the four corners of the outer case far away from the cup body.

In an embodiment of the disclosure, the buffer rubber is integratedly formed with the outer case as one piece by double injection, and the buffer rubber is combined and sealed with the outer case.

In an embodiment of the disclosure, the outer case comprises a first case and a second case, and the first case and the second case are combined and sealed with each other by high-frequency welding, ultrasonic welding or thermocompression welding.

In an embodiment of the disclosure, the vibration mechanism further comprises a fixed inner case, the fixed inner case is disposed on the second case and received in the outer case, and the fixed inner case and the second case jointly hold and fix the vibrator.

In an embodiment of the disclosure, the vibration mechanism further comprises a vibration absorber, and the vibration absorber is elastically clamped between the vibrator and the fixed inner case.

In an embodiment of the disclosure, the buffer rubber is flush with or protruded from a surface of the outer case.

The negative-pressure massage cup of the disclosure uses the buffer rubber disposed on a side of the outer case, which is far away from the cup body, to make the buffer rubber serve as a buffer for impact when the negative-pressure massage cup is free falling. This can absorb the impact of collision, so as to prevent the vibrator from being damaged or generating noise because of dislocation of the internal parts to effectively improve durability.

DETAILED DESCRIPTION

Figure 1:
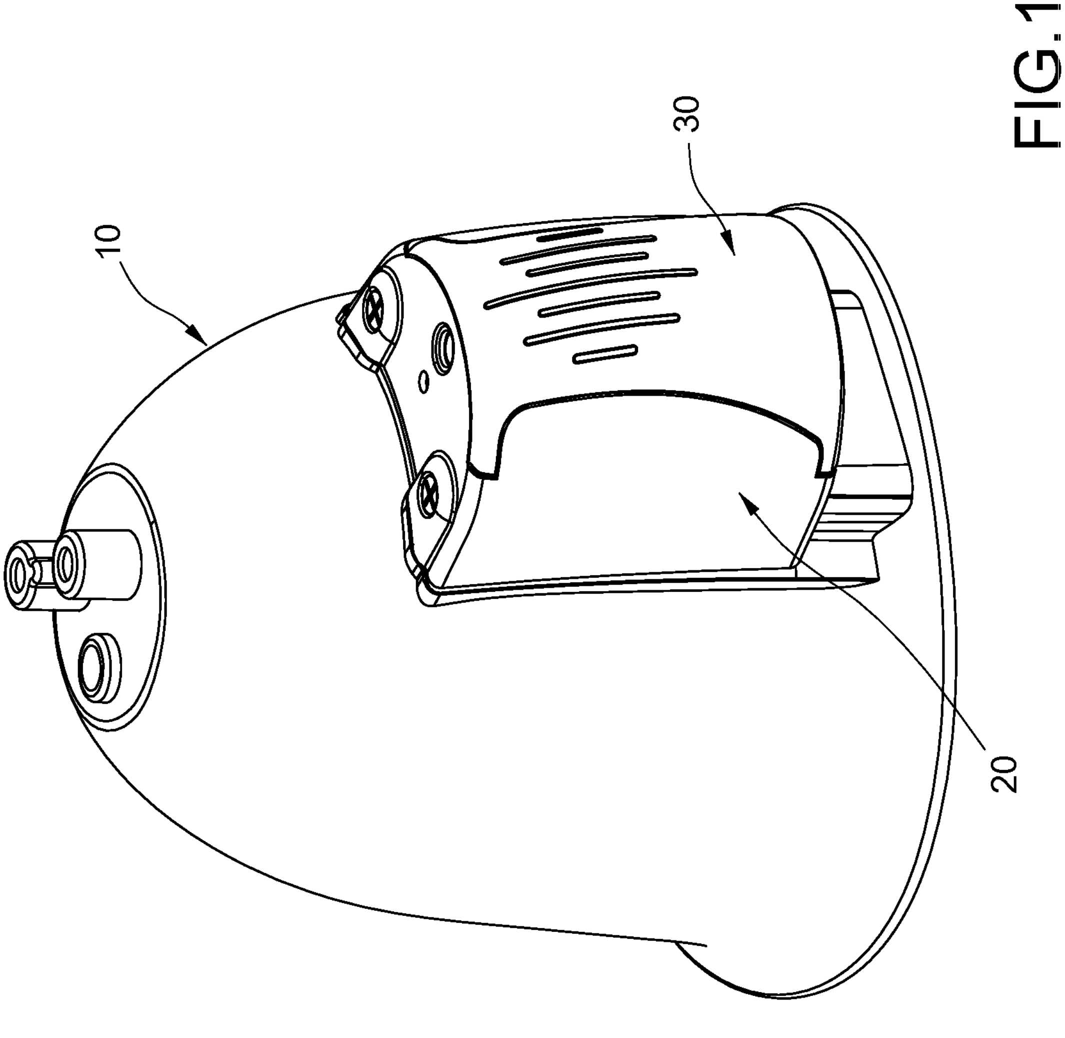
FIG. 1 is a perspective view of the disclosure.
Figure 2:
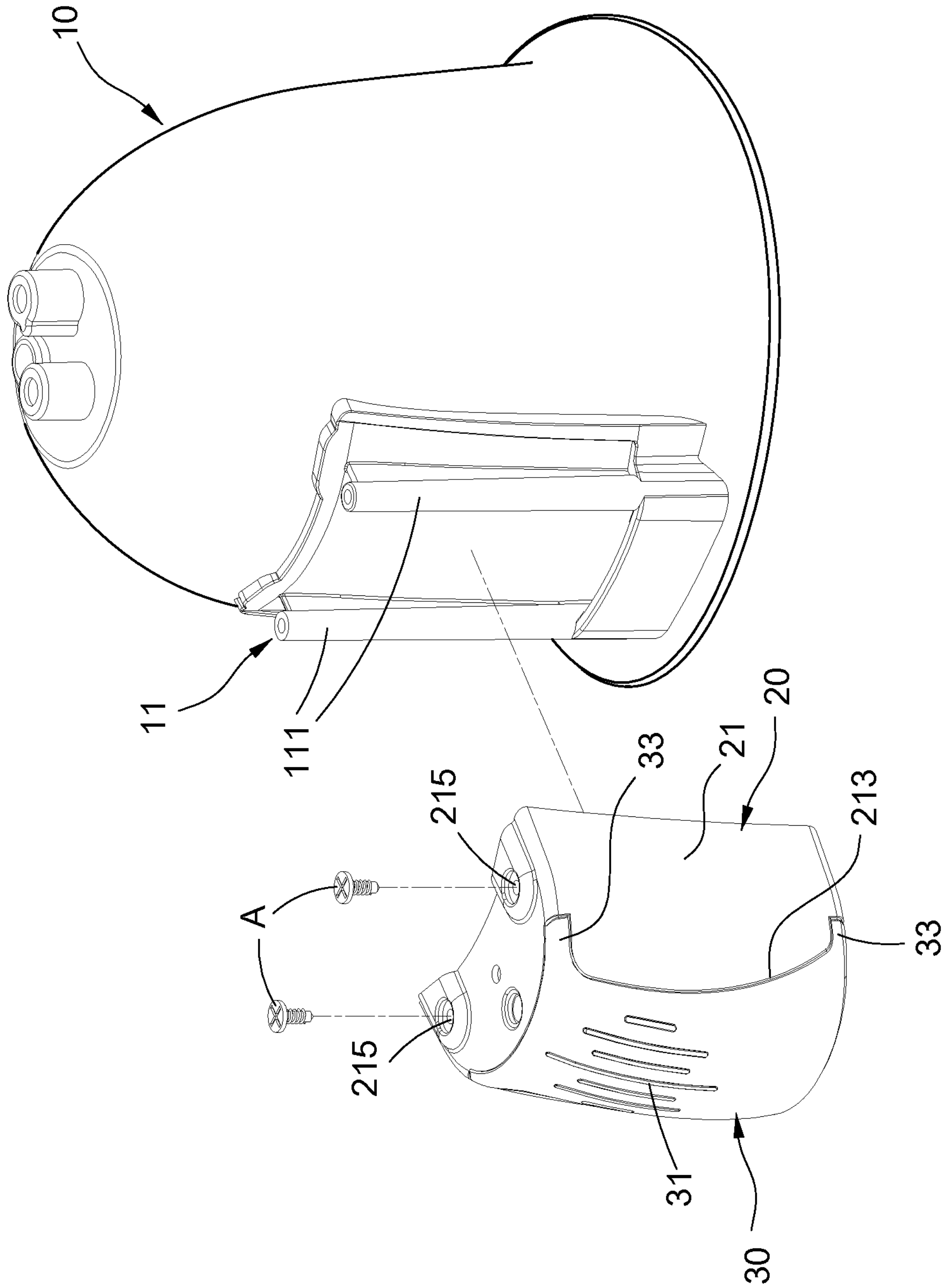
FIG. 2 is an exploded view of the disclosure.

In the description of the disclosure, it is noted that the terms indicating directions or positional relationship such as “front side”, “rear side”, “left”, “right”, “front end”, “rear end”, “distal end”, “longitudinal”, “transverse”, “perpendicular”, “top” and “bottom”, are based upon the directions or positional relationship shown in the figures. They are used to depict the disclosure and simplify the description but not to express or imply that the indicated devices or elements must have a specific direction or be constructed or operated in a specific direction. Thus, they should not be construed as limitations of the disclosure.

The terms used in the description, such as “first”, “second”, “third”, “fourth” and “fifth”, depict various elements, assemblies, regions, layers and/or portions. These elements, assemblies, regions, layers and/or portions should not be limited by the terms. These terms can only be used to distinguish an element, assembly, region, layer and/or portion from another one. Unless the context has expressively indicated, the terms, such as “first”, “second”, “third”, “fourth” and “fifth”, do not imply an order or sequence.

The technical contents of this disclosure will become apparent with the detailed description of embodiments accompanied with the illustration of related drawings as follows. It is intended that the embodiments and drawings disclosed herein are to be considered illustrative rather than restrictive.

The disclosure provides a negative-pressure massage cup, as shown in FIGS. 1-4, which includes a cup body 10, a vibration mechanism 20 and a buffer rubber 30.

In the embodiment, the cup body 10 is, but not limited to, formed as one piece by plastic injection molding, for example, the cup body 10 may also be made of acrylic or other materials. The cup body 10 has a first installing portion 11 on an outer surface thereof. There is a chamber in the cup body 10 which may be closed when contacted with human skin so that a negative pressure may be provided therein by degassing.

The vibration mechanism 20 includes an outer case 21 and a vibrator 22. The vibrator 22 is disposed in the outer case 21 and can generate vibrations. In the embodiment, the vibrator 22 is, but not limited to, an electric motor. The outer case 21 includes a first case 211 and a second case 212. In the embodiment, the first case 211 and the second case 212 are combined and sealed with each other by, but not limited to, high-frequency welding, ultrasonic welding or thermo-compression welding, any other methods which can combine and seal the both with each other to prevent dust and moisture from entering the inside are available. The outer case 21 has a second installing portion 213 and a third installing portion 214 respectively disposed at a front side and a rear sided thereof. That is, the second installing portion 213 in the embodiment is formed on an outer surface of the first case 211, and the third installing portion 214 is formed on an outer surface of the second case 212. The third installing portion 214 is detachably disposed on the first installing portion 11 so as to fix the outer case 21 on the cup body 10.

The buffer rubber 30 is disposed on the second installing portion 213. In detail, the second installing portion 213 in the embodiment is, but not limited to, a recess. The second installing portion 213 as the recess has a connecting surface 213A which is of a curved shape. An inner surface of the buffer rubber 30 is of a curved shape attached on the connecting surface 213A so as to enhance the buffering effect. In the embodiment, the buffer rubber 30 is integratedly formed with the outer case 21 as one piece by double injection to make the buffer rubber 30 and the outer case 21 form sealed connection to achieve a great fixing effect, but not limited to this. Also, the buffer rubber 30 is flush with or protruded from the surface of the outer case 21. In the embodiment, the buffer rubber 30 slightly protruded from the surface of the outer case 21 so as to guarantee that the buffer rubber 30 can be impacted prior to the outer case 21 to generate a great effect of protection and buffering when the negative-pressure massage cup of the disclosure is collided. An outer surface of the buffer rubber 30 is formed with multiple recessions 31. Each recession 31 can provide crash space to effectively improve the effect of absorbing impact when the buffer rubber 30 is collided.

While the negative-pressure massage cup is free falling accidentally, the cup body 10 is rotated by a gravity loaded on the vibration mechanism 20 because the weight of the vibration mechanism 20 is heavier than the weight of the cup body 10, so as to make the buffer rubber 30 downward to absorb and reduce an impact caused by a collision to the negative-pressure massage cup. Therefore, the vibration 22 can be prevented from damage or noise caused by dislocating of internal parts thereof so as to effectively improve durability.

Figure 3:
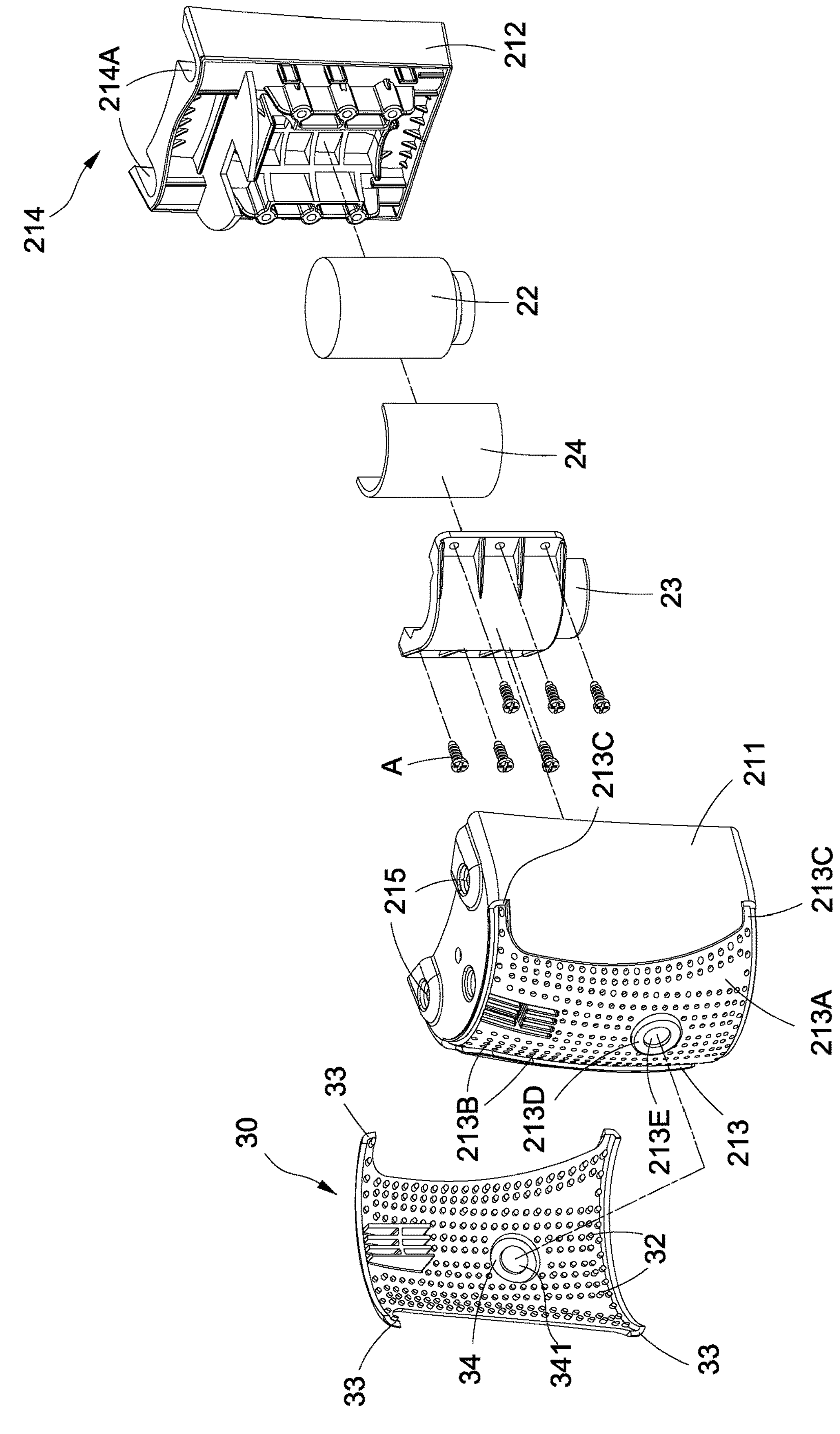
FIG. 3 is an exploded view of the vibration mechanism and the buffer rubber of the disclosure.
Figure 4:
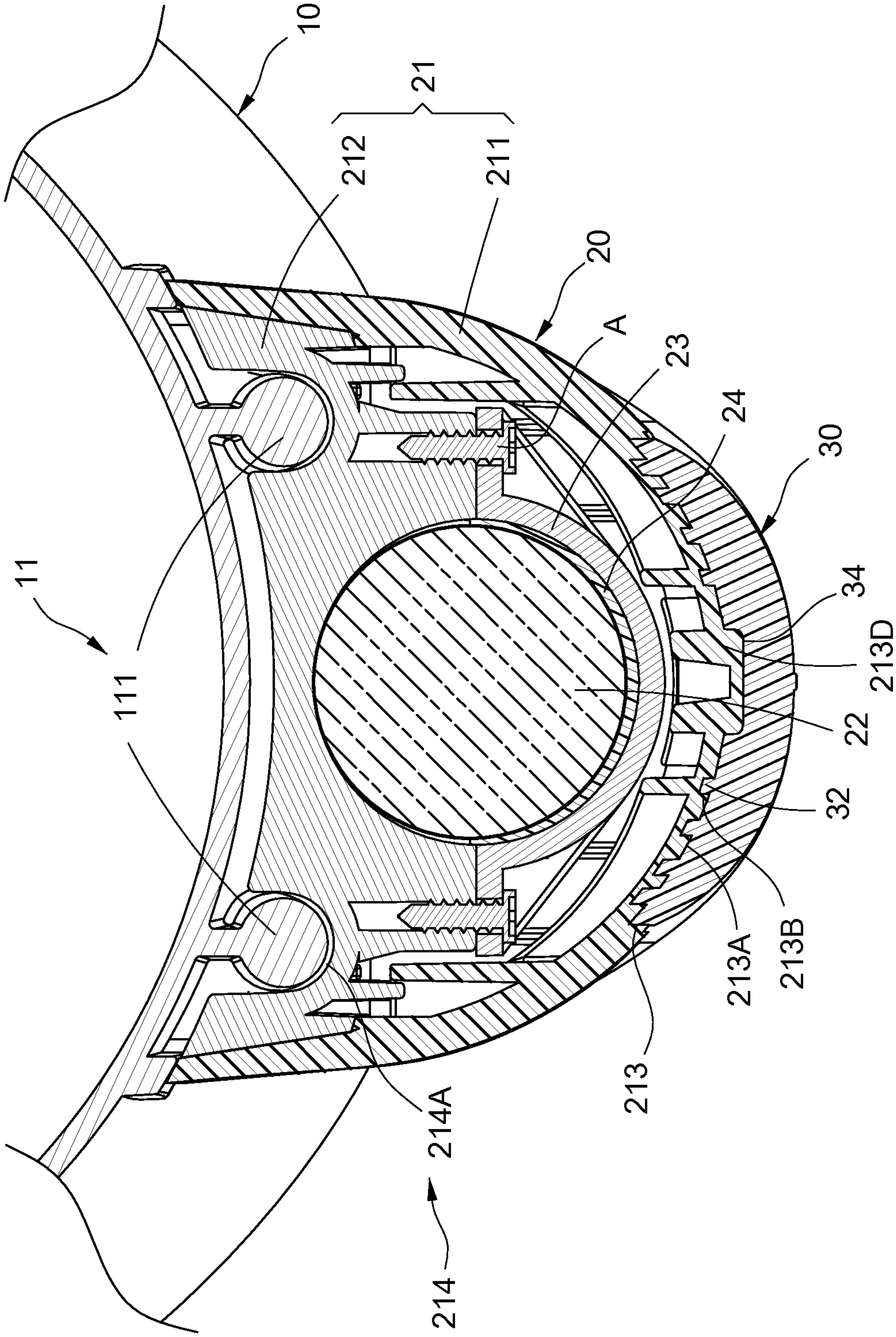
FIG. 4 is a cross-sectional view of the disclosure.

Furthermore, please refer to FIGS. 3 and 4, the connecting surface 213A has multiple holes 213B, and the inner wall of the buffer rubber 30 has multiple bars 32. The bars 32 are simultaneously combined and sealed with the holes 213B respectively and filled the holes 213B respectively so as to further reinforce the fixture and stability between the buffer rubber 30 and the outer case 21 when the buffer rubber 30 and the outer case 21 are being integratedly formed as one piece by double injection.

Also, the buffer rubber 30 has four corners and multiple arms 33 outward extended from the four corners respectively, and a trough 213C is extended from each of the four corners of the second installing portion 213 as the recess and the troughs 213C are extended corresponding to the arms 33 respectively. In the embodiment, each of the arms 33 and the troughs 213C are four in number, but not limited to this. Each arm 33 is disposed on each trough 213C to cover four corners of the outer case 21, which are far away from the cup body 10, so as to improve the effects of buffering and protection of the buffer rubber 30 to the outer case 21. In more detail, the outer case 21 has the four corners far away from the cup body 10 which are respectively covered by the arms 33, so that when the negative-pressure massage cup of the disclosure is free falling, the vibration mechanism 20 can be buffered and protected by the buffer rubber 30 regardless of impacting angle.

Please refer to FIGS. 3 and 4. The vibration mechanism 20 further includes a fixed inner case 23. The fixed inner case 23 is disposed on the second case 212 and received in the outer case 21. In detail, the fixed inner case 23 of the embodiment is fixed on an inner surface of the second case 212 by multiple bolts A, but not limited to this. The fixed inner case 23 and the second case 212 jointly hold and fix the vibrator 22 to effectively fix the vibrator 22 and make the vibrator 22 be not in direct contact with the first case 211, so that the vibrator 22 can be prevented from an impaction from the buffer rubber 30 through the first case 211 when the buffer rubber 30 is collided. Also, the vibration mechanism 20 further includes a vibration absorber 24. The vibration absorber 24 is elastically clamped between the vibrator 22 and the fixed inner case 23 to further enhance the protection and buffering effect to the vibrator 22. In the embodiment, the vibration absorber 24 is, but not limited to, sponge.

In particular, the first installing portion 11 of the cup body 10 includes a pair of threaded rods 111, and the third installing portion 214 of the second case 212 of the outer case 21 includes a pair of engaging cavities 214A for accommodating corresponding the threaded rods 111 respectively. Each engaging cavity 214A of the third installing portion 214 can accommodate and engage with each threaded rod 111 to fix the outer case 21 on the cup body 10. In this embodiment, the first case 211 of the outer case 21 further includes a pair fixing holes 215. The fixing holes 215 are arranged corresponding to positions of the engaging cavities 214A and communicated with the engaging cavities 214A respectively, so as to allow a pair of bolts A to respectively pass through the fixing holes 215 and then be fixed in the thread rods 111 respectively to reinforce the fixing between the outer case 21 and the cup body 10.

Please refer to FIGS. 3 and 4 again. The inner surface of the buffer rubber 30 further has a positioning indent 34, and the first case 211 of the outer case 21 is extended with a positioning protrusion 213D on the connecting surface 213A of the second installing portion 213. When the buffer rubber 30 is formed on the second installing portion 213 by double injection, the positioning indent 34 is combined and sealed with the positioning protrusion 213D to make the buffer rubber 30 have a positioning effect. Preferably, the center of the positioning indent 34 is formed with a positioning rod 341. The center of the positioning protrusion 213D is formed with a positioning hole 213E. The positioning rod 341 is combined and sealed with the positioning hole 213E to further enhance the positioning effect between the both.

While this disclosure has been described by means of specific embodiments, numerous modifications and variations could be made thereto by those skilled in the art without departing from the scope and spirit of this disclosure set forth in the claims.

What is claimed is:

1. A negative-pressure massage cup comprising:

a cup body, comprising a first installing portion on an outer surface of the cup body;

a vibration mechanism, comprising an outer case and a vibrator, the vibrator being disposed in the outer case, the vibration mechanism comprising a second installing portion and a third installing portion respectively disposed on two opposite sides of an outer wall of the outer case, and the third installing portion being removably disposed on the first installing portion; and a buffer rubber, disposed on the second installing portion and located on a side of the outer case away from the cup body and exposed outside of the outer case;

wherein the cup body is configured to rotate under the action of gravity while the negative-pressure massage cup is free falling so as to make an impact area of the buffer rubber face downwardly to absorb and reduce an impact cause by a collision to the negative-pressure massage cup.

2. The negative-pressure massage cup of claim 1, wherein the second installing portion is a recess comprising a connecting surface, and the buffer rubber comprises an inner surface attached on the connecting surface.

3. The negative-pressure massage cup of claim 2, wherein the connecting surface comprises multiple holes, and the inner surface of the buffer rubber comprises multiple bars combined and sealed with the holes respectively.

4. The negative-pressure massage cup of claim 2, wherein the connecting surface is a curved surface.

5. The negative-pressure massage cup of claim 2, wherein the buffer rubber comprises multiple arms extended therefrom, the second installing portion comprises four corners, each corner is provided with a trough, the troughs are extended corresponding to the arms respectively, and the arms are disposed on the troughs respectively to cover the four corners of the outer case away from the cup body.

6. The negative-pressure massage cup of claim 1, wherein the buffer rubber is integratedly formed with the outer case as one piece by double injection, and the buffer rubber is combined and sealed with the outer case.

7. The negative-pressure massage cup of claim 1, wherein the outer case comprises a first case and a second case, and the first case and the second case are combined and sealed with each other by high-frequency welding, ultrasonic welding or thermocompression welding.

8. The negative-pressure massage cup of claim 7, wherein the vibration mechanism further comprises a fixed inner case, the fixed inner case is disposed on the second case and received in the outer case, and the fixed inner case and the second case jointly hold and fix the vibrator.

9. The negative-pressure massage cup of claim 8, wherein the vibration mechanism further comprises a vibration absorber, and the vibration absorber is clamped between the vibrator and the fixed inner case.

10. The negative-pressure massage cup of claim 1, wherein the buffer rubber is flush with or protruded from a surface of the outer case.

* * * * *